May 29, 1951  W. P. WAITE  2,554,650
FISH ROD CARRIER
Filed March 8, 1948

INVENTOR.
WAYNE PAUL WAITE
BY
Martin E. Anderson
ATTORNEY

Patented May 29, 1951

2,554,650

UNITED STATES PATENT OFFICE 2,554,650

FISH ROD CARRIER

Wayne Paul Waite, Denver, Colo.

Application March 8, 1948, Serial No. 13,550

3 Claims. (Cl. 224—42.1)

This invention relates to improvements in fish-rod carriers for use with automobiles.

During the fishing season many fishermen drive considerable distances to their favorite fishing streams and of course they carry with them proper fishing tackle, including fishrods of various kinds.

Where the fishrods are of the sectional type they may be taken apart and carried in a rather short package during transportation and can therefore be transported inside of the car body. In many instances, however, the fisherman prefers to carry his rod fully assembled and it also frequently happens that instead of a sectional rod they carry a bamboo rod of considerable length. When long rods are transported by automobile they must either project through the automobile window or be secured to the outside of the car body. When carried outside of the car body, they may be supported on hooks that, in turn, are supported from the window frame or they may be tied to the fenders; in either of these cases they block the door so that it cannot be opened, and this makes it necessary for the fisherman to enter and leave his car from one side only, which is sometimes very inconvenient, as a car is often parked in places where there is brush and this frequently is on the side of the car where the exit and entrance must take place.

It is the object of this invention to produce a carrier that can be applied to the top of the car body in the manner now quite common for transporting skiis and the like. These carriers are connected with the car body, having hooks that engage the under side of the rain trough with which cars are now quite universally provided.

It is the object of this invention to produce a carrier of the type indicated that shall be provided with clamping means for holding fish rods in such a way that they do not scratch or mar the highly varnished and polished surface of the rods.

Another object is to provide carriers that can be employed for carrying rods of any length and from which they may be readily removed and also readily replaced.

This invention, briefly described, consists in two substantially straight pieces of wood or other material provided at their ends with rubber suction cups that fit against the top surface of the car body. Means is provided for attaching these devices to the car by means of hooks engaging the rain trough as above intimated. The carrier comprises two members that are applied in spaced relation, one of them is provided with spring clamps for engaging the end of the fish pole adjacent the reel and the other with a specially constructed spring clamping device for engaging the thin portion of the rod.

The invention to which this application relates is directed more particularly to the clamping means used for engaging the thin portion of the rod in such a way as to hold the same firmly and prevent marring or scratching the surface thereof.

Having thus described the principal objects of the invention and in a general way described the invention itself, the latter will now be described in detail and for this purpose reference will be had to the accompanying drawings in which the invention has been illustrated in its preferred form, and in which:

Figure 1:
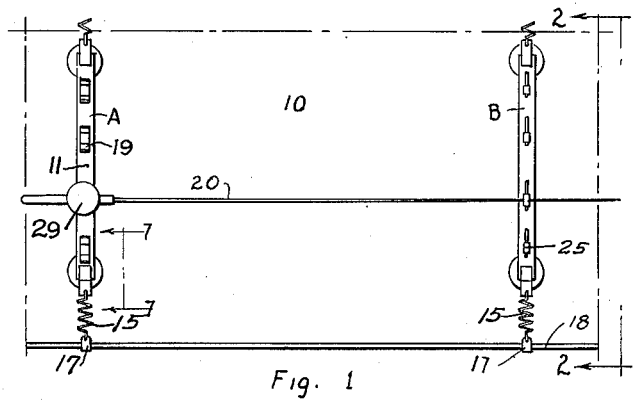
Figure 1 is a top plan view looking downwardly onto an automobile top to which the carriers are attached.
Figure 2:
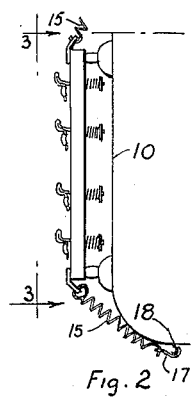
Figure 2 is a section taken on line 2—2, Figure 1.
Figure 3:
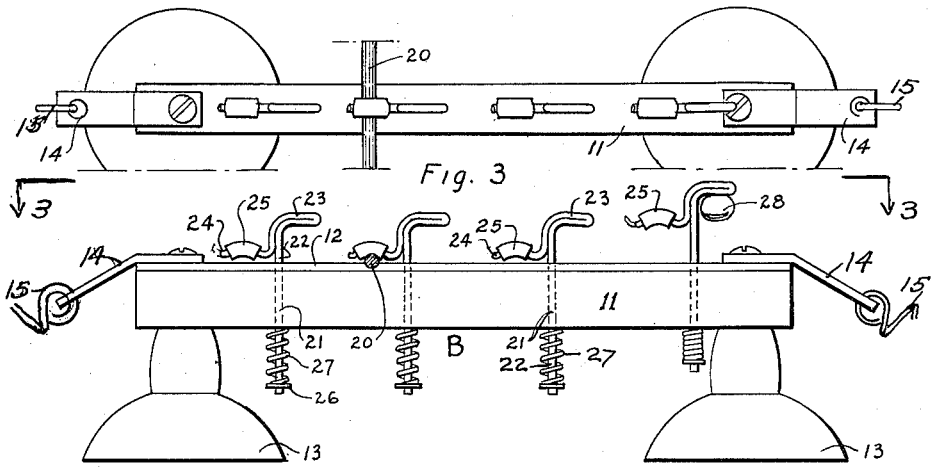
Figure 3 is a top plan view of one of the carrier members looking downwardly through plane 3—3, Figure 2.
Figure 4:
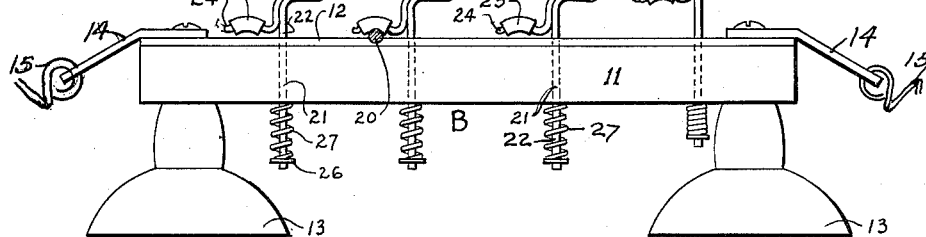
Figure 4 is a side elevation of the carrier member shown in Figure 3.
Figure 7:
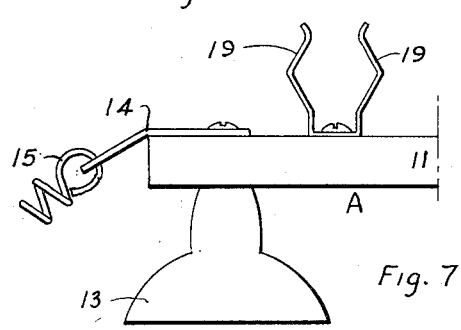
Figure 7 is a side elevation showing a short section of the holder that cooperates with the holder shown in Figures 3 and 4.
Figure 8:
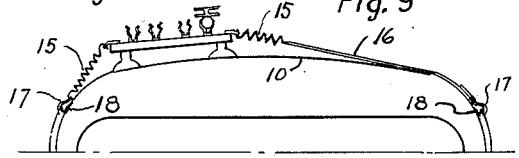
Figure 8 is a diagrammatic view showing the relative position of the holder and the automobile body.

In the drawing reference numeral 10 designates the top of an automobile body which is of usual construction. Secured to the top of the body are two carrier members that have been designated by A and B. Referring now to Figure 4 in which the carrier member B is shown in side elevation, it will be observed that this member consists of a wooden bar 11 having a layer of sponge rubber 12 secured to its upper surface. At each end is a suction cup 13 that is held in place by means of suitable screws or bolts that have not been shown. At each end of bar 11 is a metal link 14 to which springs 15 are attached as indicated in Figures 2 and 7. The springs have attached to their outer ends suitable webbings 16 that terminate in hooks 17 which engage underneath the troughs 18 of the automobile body. Carrier member A is provided with four spring clips like those shown in Figure 7, each clip having two upwardly extending arms 19 of substantially the shape shown. These clips are for the reception of the large end of fish rod 20 which is positioned therein in a manner indicated in Figure 1.

The invention to which this application is directed relates to the construction of the carrier member B and more particularly to the means for clamping a fish pole in position thereon.

Referring now more particularly to Figure 4, it will be seen that member 11 is provided with four spaced openings that have been indicated by dotted lines and designated by reference numeral 21. Positioned in each of these openings is a clamping member which, in the embodiment illustrated, is formed from a piece of wire bent into the shape shown. This member has a downwardly extending straight portion 22 that curves laterally at some distance above the sponge rubber strip and forms a finger grip for use in raising the clamping member. The part designated by reference numeral 23 is then reversely bent and terminates in a laterally extending portion 24 which is upwardly convex and provided with a cover of rubber tubing which has been indicated by reference numeral 25. The lower end of the stem 22 has positioned thereon a washer 26 that forms an abutment for the spring 27 which is under compression and normally tends to move the laterally extending arm 24 downwardly. In Figure 4, fish rod 20 has been shown in position underneath one of the lateral arms. When the rod is to be released, the operator merely lifts released, the operator merely lifts part 23 upwardly against the action of the spring, into the position shown to the right in Figure 4 where reference numeral 28 indicates the finger that is used for lifting the clamping member. With the arrangement shown four rods may be carried, of course a greater number may be carried by increasing the length of the bar or by placing the parts closer together. The spacing, of course, must be sufficient to accommodate the fishing reel which has been shown in Figure 1 and designated by numeral 29.

Figure 5:
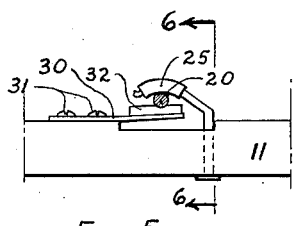
Figure 5 is a fragmentary side elevation showing a slightly modified form of securing device.
Figures 6, 9:
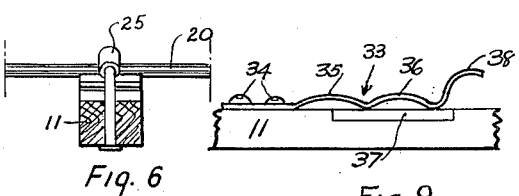
Figure 6 is a section taken on line 6—6, Figure 5.
Figure 9 is a fragmentary view showing a modification.

In Figures 5 and 6, a slightly modified form of construction has been shown. In this form the clamping member carrying the rubber tube 25 is not slidable in the bar, but is held stationary and is curved somewhat as shown. A flat spring 30 is secured to the upper surface of the bar by means of rivets or screws 31 and is normally upwardly ranging. The spring is covered with a layer of sponge rubber or other suitable material 32 that will not scratch the fishing rod. The width of the spring and its covering is somewhat wider than the width of the bar and it can therefore be easily grasped for the purpose of releasing the fishing rod.

In Figure 9 another modification has been illustrated, a flat steel spring 33 is shown as secured at one end to the wooden bar 11 by means of screws 34. The spring has an upwardly convex portion 35 to facilitate the flexing. The rod is positioned beneath the upwardly convex section 36 and rests on the sponge rubber section 37. Part 36 may be covered with rubber in the manner shown in the other views. The outer end of spring 33 terminates in a finger grip portion 38. The action of spring 33 is to clamp the fish rod and hold it in contact with the sponge rubber pad 37.

On the drawing three different forms have been shown. Of course it is possible to incorporate the same broad idea in other forms. The feature common to the forms shown is that the rod is clamped in position by a spring action which either pulls the overhanging arm with its cover 25 downwardly, or moves the supporting member upwardly as shown in Figures 5 and 6. By having a spring clamping means of the kind indicated and covering the parts with a soft material that does not scratch or damage the highly polished rod, the rod can be easily positioned and removed, without the necessity of turning any screws or resorting to other clamps of a slow acting nature. In Figure 4 the springs have been shown as ordinary helical springs but it is to be understood, however, that any other suitable spring means may be used.

Having described the invention what is claimed as new is:

1. In a carrier for fish poles and the like, of the class in which two elongated carrier bars are secured to the top of an automobile body, in spaced parallel relation, one of the bars comprising an abutment member having a cover of yieldable material, the abutment member being stationary relative to the carrier bar, a clamp member secured to the bar and resiliently biased for movement relative to the abutment member in a direction substantially perpendicular to the longitudinal axis of the bar, the clamp member being biased to move toward the abutment member, the clamp member having a finger grip portion thereon to facilitate moving it against the resilient bias, one of said members being flat and the other having a concave portion to receive a tip portion of a fish rod therebetween, the fish rod being insertable between said members from a direction substantially parallel to the longitudinal axis of the bar upon actuation of the finger grip portion in a direction substantially perpendicular to the longitudinal axis of the bar.

2. A device in accordance with claim 1 wherein the clamp member comprises a flat spring having one end thereof secured to the bar, the spring extending in a direction substantially parallel to the axis of the bar.

3. A device in accordance with claim 1 wherein the other of the two carrier bars is provided with means for engaging the butt end of a fish rod.

WAYNE PAUL WAITE.

REFERENCES CITED

The following references are of record in the file of this patent:

UNITED STATES PATENTS

| Number | Name | Date |
| --- | --- | --- |
| 400,598 | Porter | Apr. 2, 1889 |
| 861,660 | King et al. | July 30, 1907 |
| 1,143,693 | Down | June 22, 1915 |
| 1,701,783 | Law | Feb. 12, 1929 |
| 2,031,147 | Doolin | Feb. 18, 1936 |
| 2,173,953 | Schwisow | Sept. 26, 1939 |
| 2,235,012 | Colvin | Mar. 18, 1941 |
| 2,268,958 | Porten et al. | Jan. 6, 1942 |
| 2,434,387 | Brandt | Jan. 13, 1948 |

FOREIGN PATENTS

| Number | Country | Date |
| --- | --- | --- |
| 810,807 | France | Jan. 6, 1937 |